May 3, 1960
R. A. B. LANG
2,934,894
FUEL SUPPLY AND FLAME STABILIZING APPARATUS
FOR AFTERBURNERS FOR JET ENGINES
Filed July 23, 1957
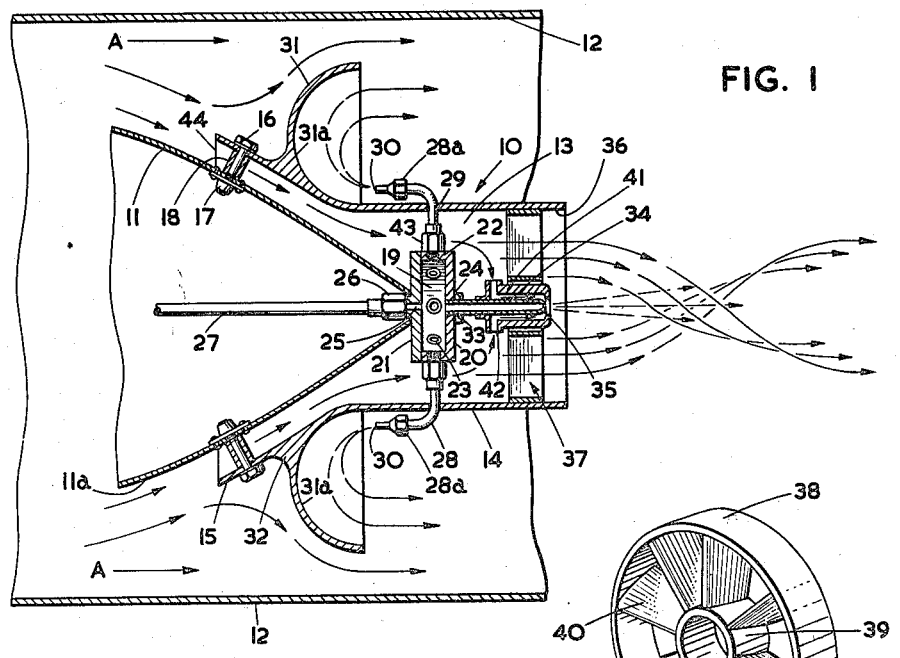
FIG. 1
FIG. 3
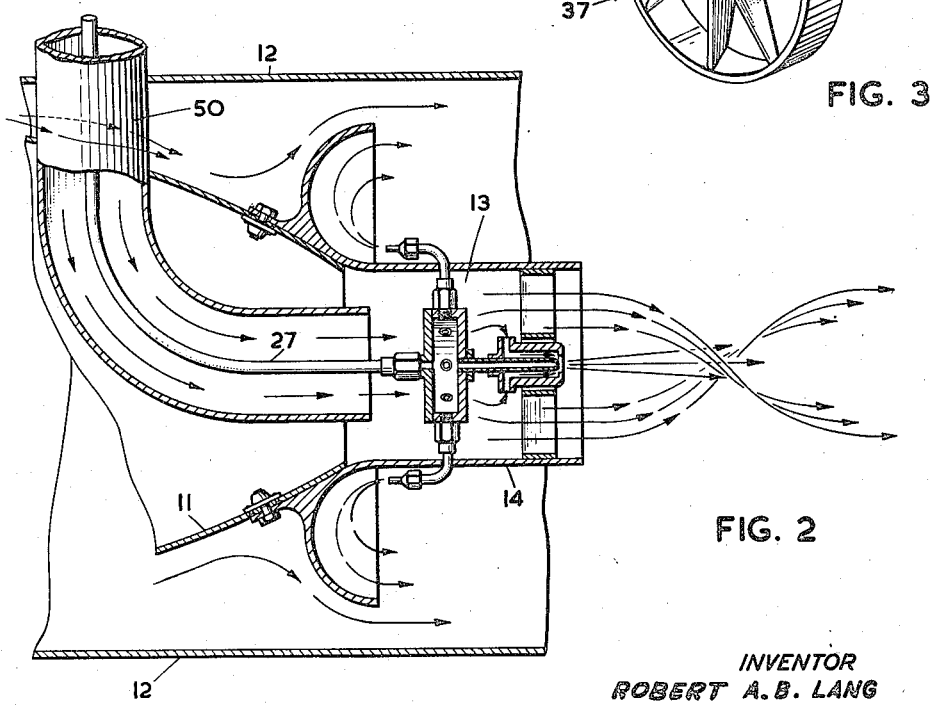
FIG. 2
INVENTOR
ROBERT A. B. LANG
BY: *Maybee & Legris*
ATTORNEYS

United States Patent Office 2,934,894
Patented May 3, 1960

2,934,894

FUEL SUPPLY AND FLAME STABILIZING APPARATUS FOR AFTERBURNERS FOR JET ENGINES

Robert A. B. Lang, Lloydtown, Ontario, Canada, assignor to Orenda Engines Limited, Malton, Ontario, Canada, a corporation Application July 23, 1957, Serial No. 673,736

8 Claims. (Cl. 60—35.6)

This invention relates to combustion apparatus and more particularly to fuel supply apparatus for high velocity combustion apparatus such as the afterburner of a gas turbine engine of the type commonly used for jet aircraft.

In order to supply fuel to an afterburner, fuel nozzles are placed within the afterburner structure and adapted to spray fuel into the combustion zone. The orifices of such interiorly disposed nozzles tend to become clogged with coke or fuel residues owing to overheating of fuel as it flows through the nozzles and is discharged into the afterburner. In order to obviate this difficulty, it is proposed by this invention to provide means to shield the fuel nozzles from the hot exhaust flow of the engine so that relatively little heat will be absorbed by the fuel prior to its flow through the orifices. In addition, in order to enable the fuel to flow through the orifices without restriction and thereby obtain the proper metering of fuel the shielding is advantageous in that it reduces any back pressures which might exist on the nozzle orifices due to the high velocity exhaust flow in the afterburner system.

Afterburner systems of the type which are conventionally employed in modern gas turbine engines are customarily fabricated in a manner which is dictated by the engine structure, and, as a rule, are designed as an integral part of the gas turbine engine. This presents certain difficulties in servicing the engine and also makes it a rather difficult task to fit an afterburner system to a gas turbine engine which has not been specifically designed to receive one.

Accordingly, it is an object of this invention to provide an afterburner system which can be adapted to a gas turbine engine with relatively little change in structure of the gas turbine engine itself.

It is an additional object of the present invention to provide such an afterburner system in which good atomization of the fuel in the exhaust flow will be achieved and in which the characteristics of the fuel flow from the fuel supply to the afterburner structure itself can be altered without any changes being made to the afterburner structure.

According to the invention, the combustion apparatus constituting the afterburner system may be mounted in a gas turbine engine having an exhaust duct and a tailcone in the duct, the combustion apparatus comprising wall means secured to the tailcone and defining a chamber open in the downstream direction, a gutter surrounding the chamber and opening in a downstream direction, a fuel manifold within the chamber and connected to a source of fuel, first fuel ejection means associated with the fuel manifold to discharge fuel into the gutter in an upstream direction, second fuel ejection means associated with the fuel manifold to discharge fuel axially of the chamber in a downstream direction and means to deliver a flow of combustion supporting gas through the chamber in the same direction as the direction of exhaust flow.

Other objects and advantages of the present invention will become apparent from a consideration of the following description of the invention when read in conjunction with the accompanying drawings in which like reference numerals denote like parts in the various views and in which:

Figure 1 is an axial cross-section view of the afterburner system applied to the tailcone of a gas turbine engine;

Figure 2 is an axial cross-section view of an alternative embodiment of the invention, and Figure 3 is a perspective view of a portion of the structure shown in Figures 1 and 2.

Referring now to Figure 1 it will be seen that the afterburner system indicated generally at 10 is mounted on the tailcone 11 which is concentrically and coaxially mounted within the tailpipe 12 which constitutes the exhaust duct of a gas turbine engine.

The afterburner 10 comprises a generally cylindrical chamber 13 defined by wall means 14 which is flared radially outwardly at 15 and mounted on the tailcone in spaced relationship thereto by means of bolts 16, nuts 17 and spacer bushings 18.

Within the chamber 13 defined by the wall means 14 is a fuel manifold 19 which is a hollow shallow cylindrical member which may comprise a cup shaped portion 20 to which is fitted an end plate 21 to enclose the fuel manifold 19. The side wall 22 of the fuel manifold is provided with a series of circumferentially spaced radially directed holes 23 and with axially directed holes 24 and 25 in the end walls of the manifold.

Hole 25 is fitted with a coupling 26 so that a fuel supply line 27 may be secured thereto to deliver fuel to the fuel manifold from a source of supply (not shown).

Each of the holes 23 may be conventionally internally screw threaded to receive the screw threaded ends of pipes or tubes 28 which, as can be seen in Figure 1, pass through aligned apertures 29 in the wall means 14 and which, externally of the wall means 14, are bent at substantially 90° and which terminate in orifices 30 which, conventionally, are directed upstream of the exhaust flow in the duct 12.

An annular gutter 31 of substantially semi-circular cross-section is mounted on the wall means surrounding the chamber 13, the gutter being open in a downstream direction. The gutter may conveniently be integral with the wall means 14 as shown in Figures 1 and 2 or, alternatively, may be fabricated from sheet metal and applied to the external surface of the wall means 14 by welding, bolting, riveting or other suitable means. If the gutter 31 is integral with the wall means 14 it will be faired smoothly into the wall means 14 at 32 as shown in order to promote a relatively streamlined flow of air through the exhaust duct. Alternatively, if the gutter 31 is not integral with the wall means 14 fillet members may be inserted at 32 to accomplish the same result.

The opening 24 in the fuel manifold 19 is also provided with a coupling 33 to which may be fitted a tube 34 which is provided at its downstream end with an orifice 35 through which fuel may be ejected axially of the chamber 13 in a direction downstream of the exhaust flow in the duct 12. It will be seen that the tube 34 is coaxial with the duct 12.

In the open end 36 of the chamber 13 defined by the wall means 14 is a swirl vane assembly indicated generally at 37 which may be seen in detail in Figure 3. The swirl vane assembly 37 comprises an annular outer collar 38 and an annular inner collar 39 through which the tube 34 passes as can be seen in Figure 1. Extending radially between the collars 38 and 39 are a series of guide vanes 40 which, as can be seen in Figure 3, are oriented angularly relative to the axis of the collars to cause a swirl pattern in the gases flowing therethrough. The angle at which the vanes 40 are set relative to the axis of the collars 38 and 39 will, of course, vary the extent and degree of swirl imparted to the gases flowing therethrough and the swirl can, of course, be caused to take place in a clockwise or counter-clockwise direction by reversing the vane mechanism in the end 36 of the chamber 13.

Surrounding the tube 34 within the inner annular collar 39 is a bushing 41 which is provided with openings 42 within the chamber 13 to admit air from within the chamber to a space surrounding the tube 34 in order to promote the admixture of the fuel and air as the fuel is ejected from the orifice 35.

As was mentioned above, the tubes 28 which lead from the fuel manifold 19 and which eject fuel, through orifices 30, into the open side of the gutter 31, are provided with lock-nuts 43 which are threadably engaged with the threaded portion of the tube 28. Thus it will be seen that the angular position of the portions 28a of the tubes 28 which lie substantially parallel to the axis of the ducts 12 may be varied relative to this axis to cause the fuel to strike the internal surface 31a of the gutter 31 at an angle to the axis of the gutter. When the desired angle has been set by rotating the tubes 28 in the holes 23 the lock-nuts 43 may be tightened down on the manifold wall 22 to lock the tubes 28 in their pre-set position.

Having described the structure of the embodiment illustrated in Figure 2 the mode of operation will now be set forth.

Air within the duct 12, or more accurately, the products of combustion of the gas turbine engine, will pass through the duct in a direction indicated by the arrows A. Due to the presence of the tailcone 11, some of this air will follow the surface of the tailcone and will enter the chamber 13 through the inlet 44 defined by the upstream end of the wall means 14 and the external surface 11a of the tailcone 11. Fuel received by the manifold 19 from the fuel supply line 27 will be ejected through orifices 30 and 35 into the gutter 31 and axially of the duct 12 into the exhaust stream. Some of the combustion supporting gas which enters the chamber 13 will enter the bushing 41 through openings 42 and will assist in admixing the ejected fuel with the exhaust stream downstream of the chamber 13. The vane mechanism 37 which is positioned in the open end 36 of the chamber 13 will impart a swirling movement to the combustion supporting gas leaving the chamber 13 to further assist in the mixture of fuel and combustion to the supporting gas.

It should be mentioned that a gas turbine engine normally operates at a high air/fuel ratio, i.e. there is more air supplied to the combustion chambers of the gas turbine engine than is required to support the combustion of the fuel, and, hence, the exhaust products of the engine contain sufficient air to support the combustion of the fuel ejected into the exhaust stream in the afterburner installation. Accordingly, although the gases flowing through the duct 12 contain the products of combustion of the combustion chambers of the gas turbine engine the gas is also properly described as a combustion supporting gas since its oxygen content is ample to support the combustion of the afterburner fuel.

Referring now to Figure 2 of the drawings, the secondary embodiment of the invention can be seen to be substantially identical in most respects to the embodiment disclosed in Figure 1. The single exception resides in the method of providing the supply of combustion supporting gas to the chamber 13 defined by the wall means 14. The supply of combustion supporting gas to the chamber 13 cannot be obtained in the same manner as that described with respect to Figure 1 since it will be seen that the wall means 14 are secured to the tailcone 11 directly without the spacing bushings 18 provided in Figure 1. Accordingly, the interior of the chamber 13 is sealed relative to the interior of the duct 12 between the tailcone and the wall means 14. In order to provide for a supply of combustion supporting air, therefore, a duct 50 is provided which passes through the wall 11 of the tailcone and passes radially of the duct 12 to an external supply of air. This may, conveniently, be bled from the compressor at a suitable stage or, alternatively, may be ram air ducted from the exterior of the aircraft. It will be noted that the duct 50 is conveniently formed of aerofoil cross-section which is oriented with respect to the air flow in the duct 12 so as to offer as little resistance as possible to the passage of the products of combustion from the main combustion chambers of the engine. It will also be appreciated that while only one duct 50 has been disclosed in Figure 3, in the interest of maintaining symmetry, an equal weight distribution and an equal resistance to flow of gases in the duct 12, the ducts 50 will be more than one in number and will be equally spaced peripherally of the tailcone 11.

The duct 50 for supplying the combustion supporting air to the chamber 13 may also conveniently carry the fuel supply conduit 27 and, in this event, the fuel supply conduit will be constantly surrounded by air at a temperature that will be lower than that in the exhaust duct 12 and, accordingly, the fuel will be maintained, at all times, in a cooler environment than that of the embodiment shown in Figure 1.

Since the remaining structure of the embodiment disclosed in Figure 2 is identical to that disclosed in Figure 1 identical reference numerals have been applied to this figure and the balance of the description with respect to Figure 1 may be read with the drawings of Figure 2.

From the above description it will be apparent that an afterburner installation has been disclosed which may be applied to any gas turbine engine having an exhaust duct and a tailcone therein without any modification of the existing structure other than to provide apertures in the tailcone to receive the bolts 16. The fuel supply conduit 27 and the combustion supporting air conduits (in the embodiment shown in Figure 2) may be added to the existing structure of the aircraft with a minimum or re-orientation of parts, and, in the embodiments shown in Figure 2, the normal radially extending supporting struts for the tailcone may house the fuel conduits 27 and may constitute the conduits 50 for the supply of combustion supporting air.

Having described the invention in detail with respect to a preferred and a secondary embodiment it is pointed out that this description is intended to be illustrative of the invention rather than limiting and that minor modifications may be made in the construction and arrangement of parts without departing from the spirit of the invention or the scope of the appended claims.

What I claim as my invention is:

1. In a gas turbine engine having an exhaust duct and a tailcone in the duct; combustion apparatus comprising wall means secured to the tailcone and defining a chamber open in the downstream direction, a gutter surrounding the chamber in contact therewith and opening in a downstream direction, a fuel manifold within the chamber and connected to a source of fuel, first fuel ejection means associated with the fuel manifold and located immediately downstream from the gutter to discharge fuel into the gutter in an upstream direction, second fuel ejection means associated with the fuel manifold to discharge fuel axially of the chamber in a downstream direction and means to deliver a flow of combustion supporting gas through the chamber in the same direction as the direction of the exhaust flow.

2. In a gas turbine engine having an exhaust duct and a tailcone in the duct; combustion apparatus comprising wall means secured to the tailcone and defining a chamber open in the downstream direction, a gutter surrounding the chamber in contact therewith and opening in the downstream direction, a fuel manifold within the chamber and connected to a source of fuel, first fuel ejection means comprising a series of tubes leading from the manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, second fuel ejection means associated with the fuel manifold to discharge fuel axially of the chamber in a downstream direction and means to deliver a flow of combustion supporting gas through the chamber in the same direction as the exhaust flow.

3. In a gas turbine engine having an exhaust duct and a tailcone in the duct; combustion apparatus comprising wall means secured to the tailcone and defining a chamber opening in the downstream direction, a gutter surrounding the chamber in contact therewith and opening in a downstream direction, a fuel manifold within the chamber connected to a source of fuel, the fuel manifold having a series of circumferentially spaced radially directed holes in which are adjustably received first fuel ejection means comprising a series of tubes leading from the fuel manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, second fuel ejection means associated with the fuel manifold to discharge fuel axially of the chamber in a downstream direction and means to deliver a flow of combustion supporting gas through the chamber in the same direction as the direction of the exhaust flow.

4. In a gas turbine engine having an exhaust duct and a tailcone in the duct; combustion apparatus comprising wall means secured to the tailcone and defining a chamber opening in the downstream direction, a gutter surrounding the chamber in contact therewith and opening in a downstream direction, a fuel manifold within the chamber and connected to a source of fuel, the fuel manifold having a series of circumferentially spaced radially directed holes in which are adjustably received first fuel ejection means comprising a series of tubes leading from the fuel manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, second fuel ejection means associated with the fuel manifold to discharge fuel axially of the chamber in a downstream direction, means to deliver a flow of combustion supporting gas through the chamber in the same direction as the direction of the exhaust flow and means at the open end of the chamber to impart a swirl to the flow of combustion supporting gas leaving the chamber.

5. In a gas turbine engine having an exhaust duct and a tailcone in the duct; combustion apparatus comprising wall means secured to and spaced from the tailcone defining a chamber which is open in both the upstream and downstream direction whereby exhaust gases flowing through the exhaust duct may pass through the chamber, a gutter surrounding the chamber in contact therewith and opening in a downstream direction, a fuel manifold within the chamber and connected to a source of fuel, first fuel ejection means associated with the fuel manifold and located immediately downstream from the gutter to discharge fuel into the gutter in an upstream direction, second fuel ejection means associated with the fuel manifold to discharge fuel axially of the chamber in a downstream direction.

6. In a gas turbine engine having an exhaust duct and a tailcone in the duct; combustion apparatus comprising wall means secured to and spaced from the tailcone and defining a chamber open in both the upstream and downstream direction whereby exhaust gases may flow through the chamber in contact therewith, a gutter surrounding the chamber and open in a downstream direction, a fuel manifold within the chamber connected to a source of fuel, first fuel ejection means comprising a series of tubes leading from the fuel manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, second fuel ejection means associated with the fuel manifold to discharge fuel axially of the chamber in a downstream direction.

7. In a gas turbine engine having an exhaust duct and a tailcone in the duct; combustion apparatus comprising wall means secured to and spaced from the tailcone and defining a chamber open in the upstream and downstream direction whereby exhaust gases flowing through the exhaust duct may pass through the chamber, a gutter surrounding the chamber in contact therewith and opening in a downstream direction, a fuel manifold within the chamber and connected to a source of fuel, the fuel manifold having a series of circumferentially spaced radially directed holes in which are adjustably received first fuel ejection means comprising a series of tubes leading from the fuel manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, and second fuel ejection means associated with the fuel manifold to discharge fuel axially of the chamber in a downstream direction.

8. In a gas turbine engine having an exhaust duct and a tailcone in the duct; combustion apparatus comprising wall means secured to the tailcone and defining a chamber open in the upstream and downstream direction whereby exhaust gases flowing through the exhaust duct may pass through the chamber, a gutter surrounding the chamber in contact therewith and opening in a downstream direction, a fuel manifold within the chamber and connected to a source of fuel, the fuel manifold having a series of circumferentially spaced radially directed holes in which are adjustably received first fuel ejection means comprising a series of tubes leading from the fuel manifold in a radial direction and passing through the wall of the chamber, the tubes being bent at approximately 90° externally of the wall and terminating in nozzles directed in an upstream direction and located immediately downstream of the gutter to direct fuel into the gutter in a direction substantially upstream of the exhaust flow, second fuel ejection means associated with the fuel manifold to discharge fuel axially of the chamber in a downstream direction and means at the open end of the chamber to impart a swirl to the flow of exhaust gases passing through the chamber.

References Cited in the file of this patent

UNITED STATES PATENTS

| 2,529,506 | Lloyd et al. | Nov. 14, 1950 |
| 2,734,341 | Lovesey | Feb. 14, 1956 |

FOREIGN PATENTS

| 131,092 | Australia | Jan. 24, 1949 |
| 66,338 | France | Apr. 9, 1956 |
| 153,361 | Sweden | Feb. 7, 1956 |